(12) United States Patent
Kosaka

(10) Patent No.: US 8,068,976 B2
(45) Date of Patent: Nov. 29, 2011

(54) COAXIAL TWO-WHEEL VEHICLE AND METHOD FOR CONTROLLING THE SAME

(75) Inventor: Yusuke Kosaka, Chofu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 202 days.

(21) Appl. No.: 12/511,174

(22) Filed: Jul. 29, 2009

(65) Prior Publication Data

US 2010/0030440 A1 Feb. 4, 2010

(30) Foreign Application Priority Data

Jul. 29, 2008 (JP) ................................ 2008-194847

(51) Int. Cl.
*G06F 7/00* (2006.01)
*B62D 57/00* (2006.01)

(52) U.S. Cl. ............. 701/124; 701/84; 701/70; 180/7.1; 180/218; 180/65.1; 280/47; 280/30

(58) Field of Classification Search .................... 701/124
See application file for complete search history.

(56) References Cited

U.S. PATENT DOCUMENTS

| 6,779,621 | B2 * | 8/2004 | Kamen et al. ................. 180/282 |
| 7,546,889 | B2 * | 6/2009 | Kamen et al. .................. 180/7.1 |
| 2009/0051136 | A1 * | 2/2009 | Yamada et al. ............... 280/205 |
| 2010/0023248 | A1 * | 1/2010 | Nishikawa .................... 701/124 |
| 2010/0030441 | A1 * | 2/2010 | Kosaka ........................... 701/70 |

FOREIGN PATENT DOCUMENTS

| JP | 2006-211899 A | 8/2006 |
| JP | 2006-315666 A | 11/2006 |
| JP | 2007-331443 A | 12/2007 |
| JP | 4162995 | 8/2008 |
| JP | 4291732 | 4/2009 |
| WO | 2008081815 A1 | 7/2008 |

* cited by examiner

*Primary Examiner* — Thomas Black
*Assistant Examiner* — Lin B Olsen
(74) *Attorney, Agent, or Firm* — Kenyon & Kenyon LLP

(57) ABSTRACT

A coaxial two-wheel vehicle comprises a detection means that obtains get-on/off information indicating whether an occupant is on the vehicle or not. In the coaxial two-wheel vehicle, a control means performs attitude control by using a control gain set with respect to an occupied state is used if the control means determines that the vehicle is in the occupied state. The control means performs attitude control by using a control gain set with respect to an unoccupied state is used if the control means determines that the vehicle is in the unoccupied state.

15 Claims, 5 Drawing Sheets

COAXIAL TWO-WHEEL VEHICLE AND METHOD FOR CONTROLLING THE SAME

INCORPORATION BY REFERENCE

This application is based upon and claims the benefit of priority from Japanese patent application No. 2008-194847, filed on Jul. 29, 2008, the disclosure of which is incorporated herein in its entirety by reference.

BACKGROUND OF THE INVENTION

1. Field of the Invention

The present invention relates to a coaxial two-wheel vehicle and a method for controlling the same and, in particular, to a stabilization technique on the vehicle when an occupant is not thereon.

2. Description of Related Art

In recent years, movable bodies have been developed that detect their own attitude information using a gyro sensor, an acceleration sensor, etc., and that perform drive control based on the detected attitude information. In these movable bodies, by employing a principle in which attitude information of the body's own is detected from signals detected by the gyro sensor and the acceleration sensor to thereby control an attitude with an inverted pendulum, or a principle of ZMP (zero moment point) control used for controlling bipedal robots, a rotation command (specifically, a torque command, a speed command, and a position command) to a motor is calculated so as to keep its own attitude, and the resulting rotation command data is transmitted to a motor control unit. These movable bodies can keep their own attitudes with such feedback control, and can travel utilizing change of a center of gravity of the occupant.

For example, travel devices are proposed that travel with persons being thereon, and that have various vehicle body constitutions and vehicle structures, in which their own attitude information is detected and drive control is performed based on the detected attitude information. For example, in Japanese Unexamined Patent Application Publication No. 2006-211899 and Japanese Unexamined Patent Application Publication No. 2006-315666, a coaxial two-wheel vehicle in which two wheels are arranged coaxially is disclosed. We have now discovered that such the coaxial two-wheel vehicle has a characteristic that it is structurally unstable in a forward/rearward direction, so that wheels are controlled by a feedback from an attitude sensor to thereby stabilize a vehicle attitude. Additionally, operation of the vehicle, such as to travel forward, travel rearward, and turn right and left, is performed by an instruction using such as a movement of an occupant's center of gravity, inclination of a step, and a control handle. Alternatively, in some cases, remote control by a command input from an outside or an autonomous movement based on a trajectory planning of the vehicle's own may be performed.

In a general coaxial two-wheel vehicle, attitude control is not performed before a person gets on the vehicle and after he or she gets it off. Hence, the person needs to do some work, such as to support the vehicle with his or her hand(s) or to pull out and stand a retractable kickstand. Additionally, if the coaxial two-wheel vehicle is used on a slope, great force to support the vehicle or a kickstand with high strength may be needed. Further, if the occupant jumps off the vehicle, or he or she falls therefrom, there are such problems that only the vehicle spontaneously travels by a certain distance to thereby collide with others, or the vehicle is fallen to be damaged. Here, since positions of the center of gravity of a system including the occupant differ between at a time when the occupant is on the vehicle and at a time when he or she is not thereon, even if attitude control is performed when the occupant is not on the vehicle, attitude control cannot be performed well due to a same target pitch angle.

If the person wants to haul the vehicle before he or she gets it on or after he or she gets it off, as disclosed in Japanese Unexamined Patent Application Publication No. 2006-211899, it is required that haul control performed by a command input from some kind of input device under a state where the attitude control is stopped, or haul against friction of wheels, thus requiring time and effort.

On the contrary, it is a problem to stop the attitude control when the occupant is not on the vehicle. Since the coaxial two-wheel vehicle is structurally unstable, when attitude control is stopped, it cannot be self-standing and thus falls. Additionally, when the occupant gets off the vehicle during its traveling, it falls due to its inertia after traveling a certain distance. Since the target pitch angle is not changed according to a case where the occupant is on the vehicle and a case where he or she is not thereon, even if it is possible to perform attitude control only in either case, both cases cannot be dealt with.

The present invention is made to solve the above described problems, and an object thereof is to provide a coaxial two-wheel vehicle in which stability is enhanced when an occupant is not on the vehicle, and a method for controlling the coaxial two-wheel vehicle.

SUMMARY OF THE INVENTION

A coaxial two-wheel vehicle of the present invention comprises a drive means that drives two wheels arranged coaxially, a detection means that obtains get-on/off information indicating whether an occupant is on the vehicle or not, and attitude information of the vehicle, and a control means that performs attitude control by controlling drive of the wheels performed by the drive means based on a control gain, the attitude information obtained by the detection means and a command value, wherein the control means controls the drive means by switching to a mode in which a control gain set with respect to an occupied state is used if the control means determines that the vehicle is in the occupied state based on the get-on/off information obtained by the detection means, while switching to a mode in which a control gain set with respect to an unoccupied state is used if the control means determines that the vehicle is in the unoccupied state, respectively.

Here, the detection means may obtain a vehicle pitch angle as the attitude information, and the control means may control the drive means according to the obtained vehicle pitch angle by switching a command value to a target pitch angle corresponding to an occupied state if the control means determines that the vehicle is in the occupied state, while switching the command value to a target pitch angle corresponding to an unoccupied state if the control means determines that the vehicle is in the unoccupied state, respectively.

Further, the detection means may obtain a vehicle pitch angular velocity as the attitude information, and the control means may control the drive means by setting a command value in which a target pitch angular velocity is defined as substantially zero if the control means determines that the vehicle is in an unoccupied state.

Additionally, the detection means may obtain a vehicle speed as the attitude information, and the control means may control the drive means by setting a command value for reducing a target speed if the control means determines that an occupied state of the vehicle has transited to an unoccupied state of the vehicle.

Furthermore, the detection means may obtain a vehicle speed as the attitude information, and the control means may control the drive means so that the vehicle may stay at its stop position if the control means determines that an occupied state of the vehicle has transited to an unoccupied state of the vehicle and that the vehicle speed is reduced to be substantially zero. Note that the detection means may obtain a information of a vehicle position so that the vehicle may stay at its stop position, and the control means may calculate the vehicle position by integrating the vehicle speed.

Furthermore, the detection means may obtain a vehicle speed and a vehicle position as the attitude information, and the control means may control the drive means so that the vehicle may return to a person get-off position if the control means determines that an occupied state of the vehicle has transited to an unoccupied state of the vehicle and that the vehicle speed is reduced to be substantially zero.

Further, preferably, the detection means obtains a vehicle speed and a vehicle position as the attitude information, and the control means controls the drive means according to either a mode in which the vehicle stays at its stop position or a mode in which the vehicle returns to a person get-off position if the control means determines that an occupied state of the vehicle has transited to an unoccupied state of the vehicle and that the vehicle speed is reduced to be substantially zero, and if a distance between the person get-off position and a current vehicle position is longer than a predetermined value, the mode is selected in which the vehicle stays at its stop position, while if the distance is not more than the predetermined value, the mode is selected in which the vehicle returns to the person get-off position. At that time, the control means may select the mode in which the vehicle returns to the person get-off position if a distance between the person get-off position and a current vehicle position is longer than a predetermined value, and the mode in which the vehicle stays at its stop position if the distance is not more than the predetermined value.

Further, the detection means may obtain a vehicle speed, a vehicle position, and a vehicle yaw angle as the attitude information, and the control means may control the drive means according to either a mode in which the vehicle stays at its stop position or a mode in which the vehicle returns to a person get-off position if the control means determines that an occupied state of the vehicle has transited to an unoccupied state of the vehicle and that the vehicle speed is reduced to be substantially zero, and if a difference between a yaw angle at a time when a person gets off the vehicle and a current yaw angle is larger than a predetermined value, the mode is selected in which the vehicle stays at its stop position, while if the difference is not more than the predetermined value, the mode is selected in which the vehicle returns to the person get-off position.

A method for controlling a coaxial two-wheel vehicle of the present invention, comprises the steps of detecting whether an occupant is on the vehicle or not, and performing attitude control using a control gain set with respect to an occupied state if it is determined that the vehicle is in the occupied state, wherein attitude control is performed using a control gain set with respect to an unoccupied state if it is determined that the vehicle is in the unoccupied state.

Here, preferably, if it is determined that the vehicle is in an occupied state, attitude control is performed by setting a command value to a target pitch angle corresponding to the occupied state, and if it is determined that the vehicle is in an unoccupied state, attitude control is performed by setting the command value to a target pitch angle corresponding to the unoccupied state.

Further, if it is determined that the vehicle is in an unoccupied state, a command value may be set in which a target pitch angular velocity is defined as substantially zero.

Furthermore, preferably, if it is determined that an occupied state of the vehicle has transited to an unoccupied state of the vehicle, a vehicle speed is controlled to be reduced.

Further, if it is determined that an occupied state of the vehicle has transited to an unoccupied state of the vehicle and that a vehicle speed is reduced to be substantially zero, the vehicle may be controlled to stay at its stop position.

Additionally, if it is determined that an occupied state of the vehicle has transited to an unoccupied state of the vehicle and that a vehicle speed is reduced to be substantially zero, the vehicle may be controlled to return to a person get-off position.

Further, preferably, if it is determined that an occupied state of the vehicle has transited to an unoccupied state of the vehicle and that a vehicle speed is reduced to be substantially zero, the vehicle is controlled according to either a mode in which the vehicle stays at its stop position or a mode in which the vehicle returns to a person get-off position, and if a distance between the person get-off position and a current vehicle position is longer than a predetermined value, the mode is selected in which the vehicle stays at its stop position, and if the distance is not more than the predetermined value, the mode is selected in which the vehicle returns to the person get-off position. At that time, if a distance between the person get-off position and a current vehicle position is longer than a predetermined value, the mode may be selected in which the vehicle returns to the person get-off position, and if the distance is not more than the predetermined value, the mode may be selected in which the vehicle stays at its stop position.

Further, preferably, if it is determined that an occupied state of the vehicle has transited to an unoccupied state of the vehicle and that a vehicle speed is reduced to be substantially zero, the vehicle is controlled according to either a mode in which the vehicle stays at its stop position or a mode in which the vehicle returns to a person get-off position, and if a difference between a yaw angle at a time when a person gets off the vehicle and a current yaw angle is larger than a predetermined value, the mode is selected in which the vehicle stays at its stop position, and if the difference is not more than the predetermined value, the mode is selected in which the vehicle returns to the person get-off position.

A coaxial two-wheel vehicle of the present invention comprises drive units that drive two wheels arranged coaxially, a detector that obtains get-on/off information indicating whether an occupant is on the vehicle or not, and attitude information of the vehicle, and a controller that performs attitude control by controlling drive of the wheels performed by the drive units based on a control gain, the attitude information obtained by the detector and a command value, wherein the controller controls the drive units by switching to a mode in which a control gain set with respect to an occupied state is used if the controller determines that the vehicle is in the occupied state based on the get-on/off information obtained by the detector, while switching to a mode in which a control gain set with respect to an unoccupied state is used if the controller determines that the vehicle is in the unoccupied state, respectively.

The above and other objects, features and advantages of the present invention will become more fully understood from the detailed description given hereinbelow and the accompa-

DESCRIPTION OF THE EXEMPLARY EMBODIMENTS

First Exemplary Embodiment

Figure 1A:
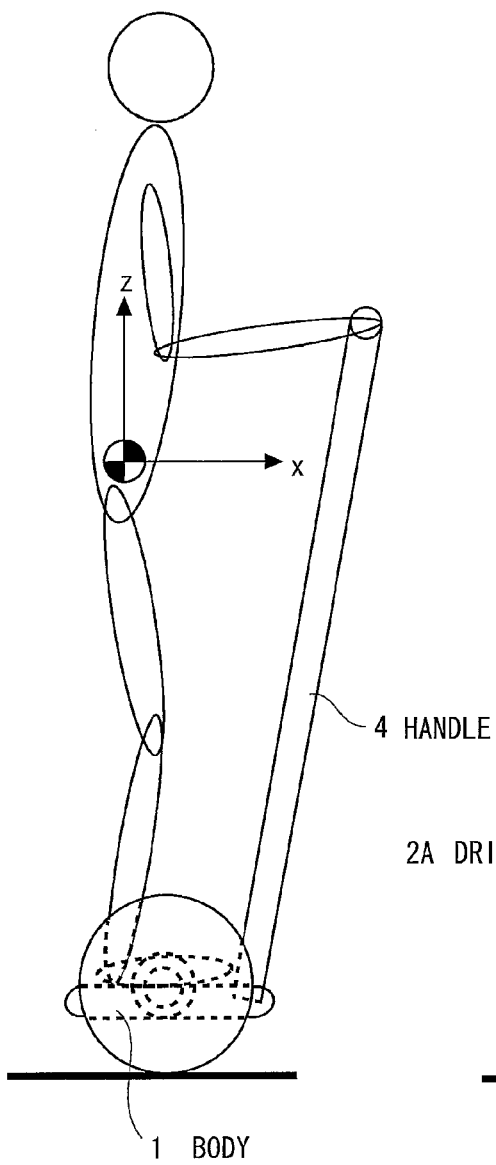
FIG. 1A shows a constitution example of a coaxial two-wheel vehicle according to an embodiment of the present invention.
Figure 1B:
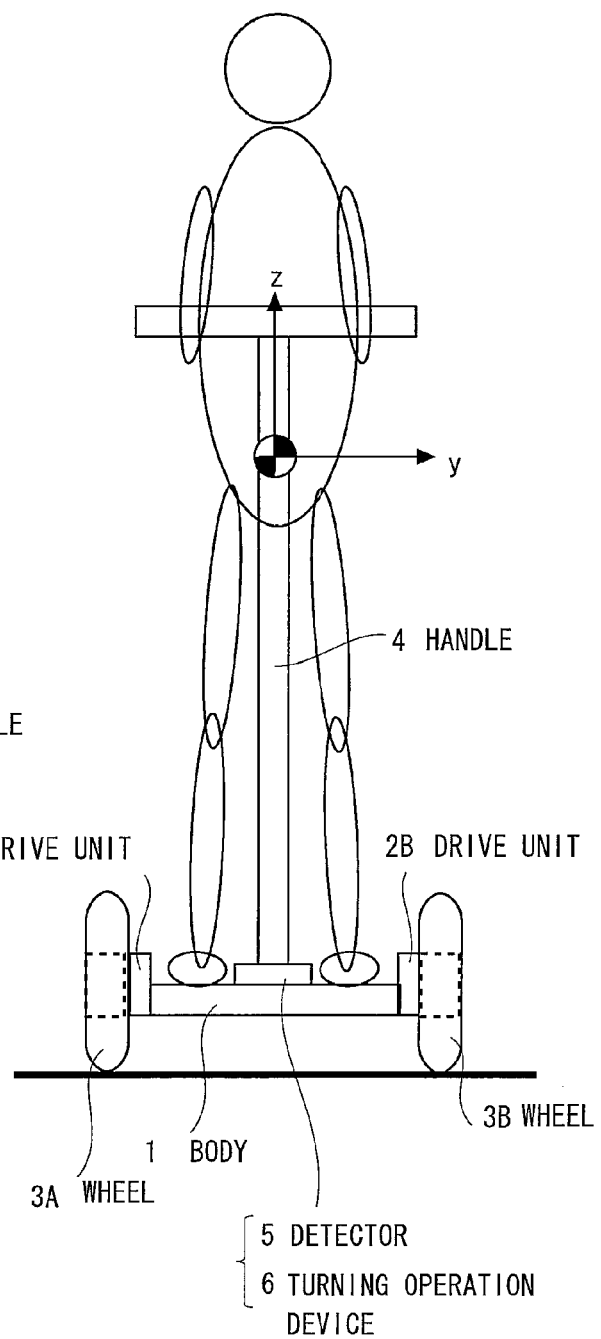
FIG. 1B shows the constitution example of the coaxial two-wheel vehicle according to the embodiment of the present invention.

FIGS. 1A and 1B show one constitution example of a coaxial two-wheel vehicle according to a present first embodiment. Note that FIG. 1A shows an elevational view and FIG. 1B shows a side view. In FIGS. 1A and 1B, the coaxial two-wheel vehicle according to the present first embodiment has wheels 3A and 3B in parallel on a coaxial core wire with respect to a body 1, which constitutes a stand for an occupant.

Note that each coordinate system with respect to the whole coaxial two-wheel vehicle used in the following explanation, as described in drawings, is defined that a perpendicular direction with respect to an axle is referred to as an X-axis, an axle direction is a Y-axis, a vertical direction is a Z-axis, a circumference of the axle (circumference of the Y-axis) is a pitch axis, and a rotational direction on a X-Y flat surface is a yaw axis viewed from a top of the vehicle, respectively.

The coaxial two-wheel vehicle according to the present first embodiment is provided with the body 1, a pair of drive units 2A and 2B that is coaxially attached to the body 1, the wheels 3A and 3B rotationally driven by the drive units 2A and 2B, respectively, a T-shaped handle 4 to which the occupant holds on, a vehicle pitch angle, which is a forward/rearward (circumference of the Y-axis) inclination of the body 1, a detector 5 that detects a vehicle pitch angular velocity, a vehicle position, a vehicle speed, and the person's getting on/off, and a turning operation device 6 that instructs a turning operation. Additionally, the body 1 is provided with a control unit 11 that performs vehicle control described hereinafter, though not shown.

Figure 2:
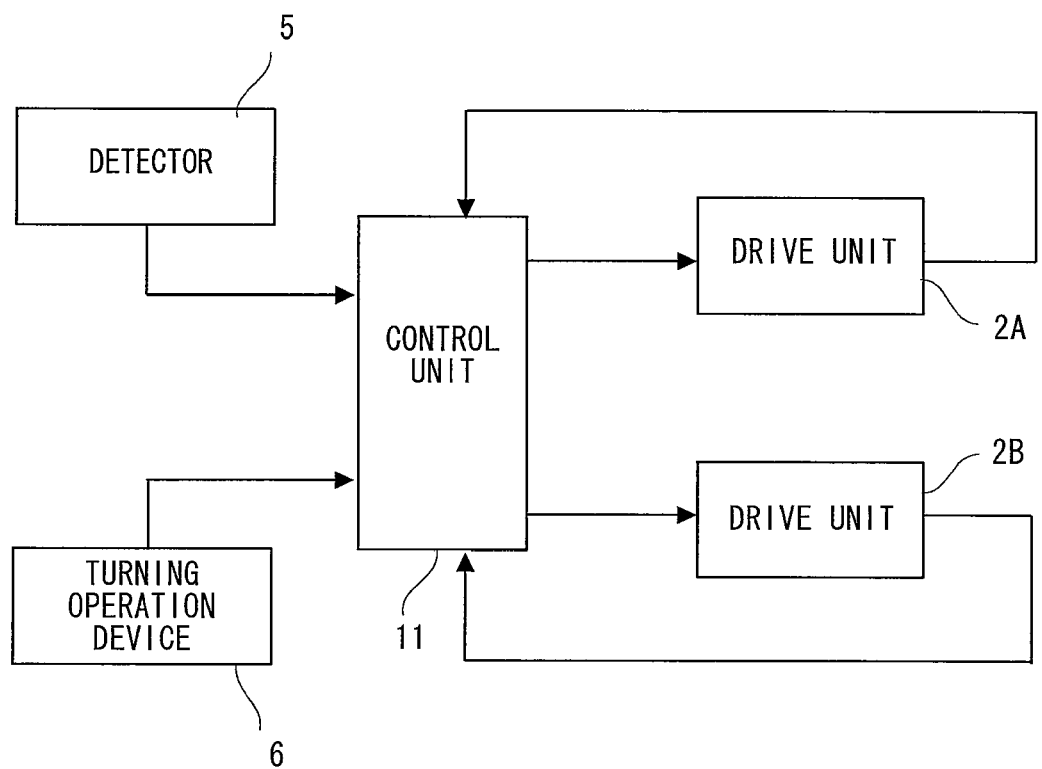
FIG. 2 is a control block diagram showing a configuration of vehicle control in the coaxial two-wheel vehicle according to the embodiment of the present invention.

FIG. 2 is a block diagram showing a configuration of vehicle control of the coaxial two-wheel vehicle according to the present first embodiment. The detector 5 detects attitude information of the vehicle, such as the vehicle pitch angle (attitude angle), the vehicle pitch angular velocity (attitude angular velocity), the vehicle position, and the vehicle speed, and the person's getting on/off.

The turning operation device 6 generates a turning angle command and a turning angular velocity command of the vehicle. The turning operation device 6, for example, responds to an operation of the handle 4 by the occupant, an operation of a turning handle (not shown) by the occupant, and then generates the turning angle command and the turning angular velocity command according to the above-described operation amount.

Additionally, a technology for inputting a turn command according to a roll angle of the vehicle inclined due to a movement of the occupant's center of gravity, which is proposed by the applicant (refer to the above-described Japanese Unexamined Patent Application Publication No. 2006-315666), may be applied to the turning operation device 6. Note that hereinafter, the turning angle command and the turning angular velocity command will be explained as a yaw angle command and a yaw angular velocity command, respectively.

The control unit 11 controls the vehicle to stably follow the vehicle pitch angle command, the vehicle pitch angular velocity command, and a vehicle position command or a vehicle speed command, which are target values. Namely, the control unit 11 calculates driving torque, a vehicle speed, and a vehicle position required to stabilize a whole system so that the vehicle may not fall based on these target values and information inputted from the detector 5 and the turning operation device 6, and then drives each motor of the drive units 2A and 2B. A wheel angle and a wheel angular velocity of the wheels 3A and 3B accompanied with rotation of the each motor of the drive units 2A and 2B are fed back to the control unit 11. According to the above-described configuration of the vehicle control, the coaxial two-wheel vehicle travels back and forth by the occupant displacing his or her center of gravity forward and rearward, and turns to right and left by the occupant operating the turning operation device 6.

Figure 3:
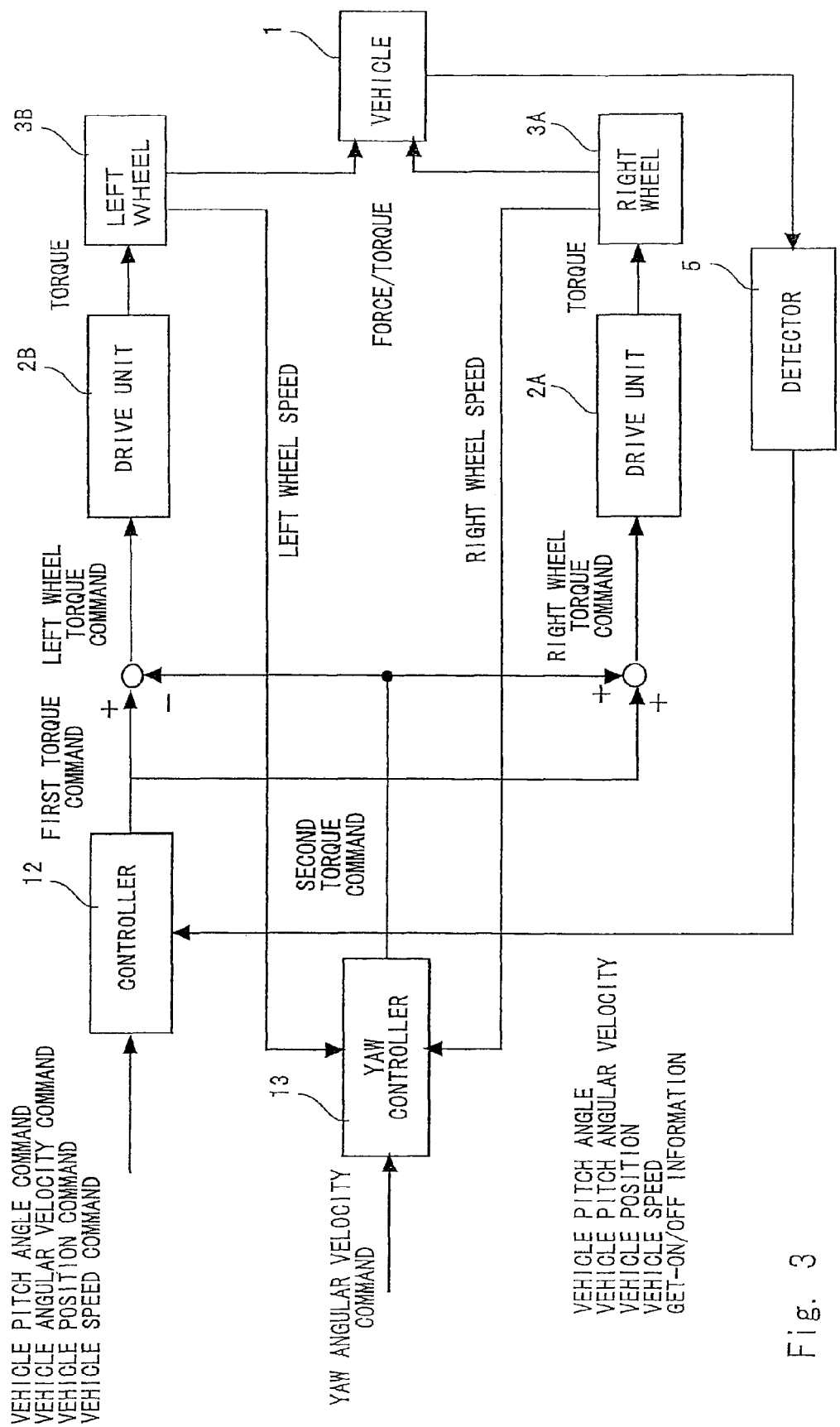
FIG. 3 is a control block diagram showing a configuration of a behavior control system of the coaxial two-wheel vehicle according to the embodiment of the present invention.

Hereinafter, behavior control of the vehicle will be explained in detail with reference to FIG. 3. FIG. 3 is a control block diagram showing a behavior control system of the coaxial two-wheel vehicle according to the present first embodiment.

First, variables used for the following explanation will be explained. $\beta$ denotes a vehicle pitch angle, and $\beta'$ denotes a vehicle pitch angular velocity. x denotes a vehicle position, and x' denotes a vehicle speed. These vehicle pitch angle $\beta$, vehicle pitch angular velocity $\beta'$, vehicle position x, and vehicle speed x' denote detected values. Additionally, $\beta_r$ denotes a vehicle pitch angle command, and $\beta'_r$ denotes a vehicle pitch angular velocity command. $x_r$ denotes a vehicle position command, and $x'_r$ denotes a vehicle speed command. $\gamma_r$ denotes a vehicle yaw angle command, and $\gamma'_r$ denotes a vehicle yaw angular velocity command. These vehicle pitch angle command $\beta_r$, vehicle pitch angular velocity command $\beta'_r$, vehicle position command $x_r$, and vehicle speed command $x'_r$ denote command values, which are target values. Namely, the variables to which a subscript r is attached denote the command values, while the variables to which the subscript r is not attached the detected values. Further, $\omega_L$ denotes a left wheel speed, $\omega_R$ a right wheel speed, 2L a tread width of the vehicle, and $R_w$ a wheel radius, respectively. Note that in the present first embodiment, the behavior control of the vehicle in FIG. 3 illustrates one at the time of normal traveling.

In FIG. 3, the drive units 2A and 2B are torque controllers that independently drive a plurality of wheels 3A and 3B arranged coaxially, respectively. The drive units 2A and 2B include the motors and amplifiers for driving each of the wheels 3A and 3B, and perform torque control in response to a torque command to be inputted. Torque is applied to the wheels 3A and 3B accompanied with rotation of the motors.

Additionally, a force as a reaction force is applied to the vehicle body 1 accompanied with the rotation of the wheels 3A and 3B, as well as a reaction force of the torque is applied to the vehicle body 1 accompanied with the rotation of the motors. By wheel speed detection means, which is not shown, a wheel angle and a wheel angular velocity are detected as a relative angle and a relative angular velocity between the body 1 and the plurality of wheels 3A and 3B. The wheel speed detection means can obtain the relative angular velocity between the vehicle body 1 and the wheels 3A and 3B, for example, by an encoder, and can evaluate a wheel speed with respect to the ground by compensating the wheel angular velocity obtained by the encoder with the pitch angular velocity. Namely, a following equation is established.

A wheel speed with respect to the ground ω=a wheel angular velocity θd+a pitch angular velocity βd Additionally, wheel angular velocity detection means detects a right wheel speed and a left wheel speed, and then outputs them to a yaw controller 13. The wheel angular velocity detection means detects a wheel angle, a wheel angular velocity, and a wheel speed, for example, from encoder information provided on an axis of rotation of the motor.

The detector 5 detects a vehicle pitch angle (attitude angle), a vehicle pitch angular velocity (attitude angular velocity), a vehicle position, a vehicle speed of the body 1, and person's getting on/off, and then outputs them to a controller 12. The detector 5 detects the vehicle pitch angle and the vehicle pitch angular velocity using a gyro sensor or an acceleration sensor. Additionally, the detector 5 evaluates a current position of the vehicle, for example, using odometry. The detector 5 further detects the person's getting on/off, for example, using a sensor or a switch.

In the controller 12 are inputted the vehicle pitch angle, the vehicle pitch angular velocity, the vehicle position, the vehicle speed, and get-on/off information detected by the detector 5, as well as the vehicle pitch angle command, the vehicle pitch angular velocity command, the vehicle position command, and the vehicle speed command. The controller 12 calculates differences between the inputted vehicle pitch angle command and vehicle pitch angle, the vehicle pitch angular velocity command and the vehicle pitch angular velocity, the vehicle position command and the vehicle position, and the vehicle speed command and the vehicle speed, and performs state feedback control using control gains, for example, according to a next Equation 1 so that the differences may converge with zero.

A first torque command=$K_1(\beta_r-\beta)+K_2(\beta'_r-\beta')+K_3(x_r-x)+K_4(x'_r-x')$      Equation 1

A follow property changes that the motor responds with respect to the vehicle pitch angle command $\beta_r$, the vehicle pitch angular velocity command $\beta'_r$, etc. due to these control gains. For example, when a proportional gain $K_1$ is decreased, a motor rotor moves slowly with a delay in following, while when the proportional gain $K_1$ is increased, the motor rotor follows at a high speed. As described above, it becomes possible to adjust errors between the command values, such as the vehicle pitch angle command $\beta_r$ and the vehicle pitch angular velocity command $\beta'_r$, and the detected values, such as the actually detected vehicle pitch angle $\beta$ and vehicle pitch angular velocity $\beta'$, and also adjust response time by changing the control gains.

The control gains $K_1$ to $K_4$ as feedback gains may be changed according to the occupant's height, weight, etc., or alternatively, they may be set by assuming the occupant's average height and weight. In the control according to the present embodiment, each of the control gains $K_1$ to $K_4$ is set as a different value in a case where the occupant is on the vehicle and in a case where the occupant is not thereon, i.e., the vehicle is in an unoccupied state, thus an optimum value being set according to the each case. It is to be noted that the controller 12 may perform the control using not only PD control but H8 control, fuzzy control, etc.

The yaw controller 13 functions as a turn controller, inputs the yaw angular velocity command $\gamma'_r$, the left wheel speed $\omega_L$, and the right wheel speed $\omega_R$, and generates a second torque command, which is a turning speed command. The yaw angular velocity command is inputted by the aforementioned turning operation device 6. The yaw controller 13 calculates an actual yaw angular velocity $\gamma'$ from the inputted left wheel speed $\omega_L$ and right wheel speed $\omega_R$, and from the preset tread width 2L of the vehicle and the wheel radius $R_w$ according to a following equation.

$\gamma'=R_w(\omega_R-\omega_L)/2L$      Equation 2

Next, PI (proportional-integral) control is performed so that the actual yaw angular velocity $\gamma'$ corresponds to the yaw angular velocity command $\gamma'_r$ and then the second torque command is generated, for example, based on a following equation.

The second torque command=$K_{dy}(\gamma'_r-\gamma')+K_{iy}\int(\gamma'_r-\gamma')dt$      Equation 3 where, $K_{dy}$ and $K_{iy}$ are feedback gains (control gains) According to a next Equation 4, the second torque command generated by the yaw controller 13 is subtracted from the first torque command generated by the controller 12 using a subtractor to thereby calculate a left wheel torque command, and then it is inputted in the drive unit 2B.

The left wheel torque command=the first torque command−the second torque command      Equation 4

Additionally, the first torque command generated by the controller 12 is added to the second torque command generated by the yaw controller 13 using an adder to thereby calculate a right wheel torque command, and then it is inputted in the drive unit 2A.

The right wheel torque command=the first torque command+the second torque command      Equation 5

With the above-described control system, both attitude/position/speed control and yaw control can be achieved.

The controller 12 obtains the vehicle position from the detector 5, and stores it in memory means as past history information. Particularly, in the present embodiment, the controller 12 has stored position information when the person gets off the vehicle.

Subsequently, behavior control of the vehicle according to the person's getting on/off movements will be explained using a flow chart shown in FIG. 4.

After starting whole control, first, attitude/speed/position control (hereinafter, referred to as an unoccupied attitude/speed/position control mode) is started (S101). In this step, since the person has not yet got on the vehicle, the attitude/position/speed control is performed using a control gain set with respect to a state where the occupant is not on the vehicle, i.e., an unoccupied state.

Specifically, in the controller 12, a target pitch angle is defined as a pitch angle at which center of gravity of the vehicle can be balanced when the occupant is not thereon, a target pitch angular velocity as zero, a target position as a position at a time when control is started, and a target speed as zero. As described above, by using the control gains corresponding to the unoccupied state, and setting preferable target values to thereby perform the attitude/speed/position control, a safe vehicle can be provided that can stay at a current position with the attitude control being performed, and that does not travel away even on a slope even if it is pushed.

Next, the controller 12 determines whether the person has got on the vehicle or not based on the get-on/off information inputted from the detector 5 (S102). If the controller 12 cannot confirm that the person has got on the vehicle, the unoccupied attitude/speed/position control mode (S101) is continued to be performed. If the controller 12 confirms that the person has got on the vehicle, the program proceeds to Step S103. It is to be noted that switching modes is preferably performed smoothly. Further, the control gains gradually changing in the switching modes, prevents the changing shock.

In control according to Step S103 (hereinafter, referred to as an occupied attitude control mode), attitude control is performed using a control gain set with respect to the occupied state. A target pitch angle is defined as a pitch angle at which center of gravity of the vehicle can be balanced when the occupant is thereon, and a target pitch angular velocity as zero. At this time, the pitch angle is normally an angle that indicates a horizontal state (0 degree).

As a target position and a target speed, the detected current position and speed are used as they are. As a result, terms of the control gains $K_3$ and $K_4$ in the Equation 1, i.e., the term of the position control and that of the speed control become zeros, so that only the attitude control and the yaw control are performed without performing the speed and position control. As a result, normal traveling by the occupant can be performed. Since the vehicle speed command $x'_r$ is automatically changed to a smaller value than the current vehicle speed $x'$ in response to the occupant's brake lever operation, or when a speed limit is exceeded, the term of the control gain $K_4$ in the Equation 1, i.e., the term of the speed control becomes effective, and thus the speed of the vehicle is reduced.

Next, the controller 12 determines whether the person has got off the vehicle or not based on the get-on/off information inputted from the detector 5 (S104). If the controller 12 cannot confirm that the person has got off the vehicle, the occupied attitude control mode (S103) is continued to be performed. If the controller 12 confirms that the person has got off the vehicle, i.e., if it determines that the occupied state of the vehicle transits to the unoccupied one, Step S105 is performed.

In control according to Step S105 (hereinafter, referred to as an unoccupied attitude/speed control mode), attitude/speed control is performed using a control gain set with respect to the unoccupied state. A target pitch angle is defined as a pitch angle at which center of gravity of the vehicle can be balanced when the occupant is not thereon, and a target pitch angular velocity as zero. As a target position, the measured current vehicle position is used as it is, and as a target speed, a speed reduction command is generated toward speed 0 from a speed at a time when the control in the unoccupied attitude/speed control mode (S105) is started. As a result, the speed of the vehicle is reduced to 0 from a speed at a time when it is confirmed that the person has got off the vehicle.

Next, the controller 12 determines whether the vehicle has stopped or not based on the vehicle speed inputted from the detector 5 (S106). If the controller 12 cannot confirm that the vehicle has stopped, a third control (S105) is continued to be performed. If the controller 12 confirms that the vehicle has stopped, Step S107 is performed.

When the controller 12 confirms that the vehicle has stopped, i.e., the vehicle speed is zero, the controller 12 performs a pattern 1 or a pattern 2, according to a situation or is preselected. The pattern 1 is a mode in which the vehicle stays at its stop position, while the pattern 2 is a mode in which the vehicle returns to a person get-off position.

As for performing the pattern 1 or 2 according to the situation, for example, the controller 12 determines as follows.

(1) If a distance between a person get-off position and a vehicle current position is longer than a preset distance, the mode is performed in which the vehicle stays at its stop position, while if the distance is shorter, the mode is selected in which the vehicle returns to a person get-off position.

Namely, if a value of the distance between the person get-off position and the vehicle current position is larger than the preset value, position control is performed with the vehicle stop position (here, vehicle current position) being defined as a target position. Additionally, if the value of the distance between the person get-off position and the vehicle current position is not more than the preset value, after-mentioned control in the pattern 2 is performed. It is to be noted that information about the person get-off position stored in the memory means is read out.

(2) If the distance between the person get-off position and the vehicle current position is longer than the preset distance, the mode is performed in which the vehicle returns to the person get-off position, while if the distance is shorter, the mode is selected in which the vehicle stays at its stop position. Namely, if the value of the distance between the person get-off position and the vehicle current position is larger than the preset value, after-mentioned control in the pattern 2 is performed.

Additionally, if the value of the distance between the person get-off position and the vehicle current position is not more than the preset value, position control is performed with the vehicle stop position (here, vehicle current position) being defined as the target position. It is to be noted that information about the person get-off position stored in the memory means is read out.

(3) If a current yaw angle and a yaw angle at a time when a person gets off the vehicle differ from each other, the mode is selected in which the vehicle stays at its stop position, while if both yaw angles are substantially the same as each other, the mode is selected in which the vehicle returns to the person get-off position. Namely, if a difference between the yaw angle at the time when the person gets off the vehicle and the current yaw angle is calculated, and the calculated value is larger than a predetermined value, position control is performed with the vehicle stop position (here, vehicle current position) being defined as the target position. Additionally, if the difference value is not more than the predetermined value, after-mentioned control in the pattern 2 is performed.

The control in the pattern 2, in which the vehicle returns to the person get-off position, will be explained. In this control, first, the attitude/position/speed control is performed using the control gain set with respect to the unoccupied state. A target pitch angle is defined as a pitch angle at which center of gravity of the vehicle can be balanced when the occupant is not thereon, a target pitch angular velocity as zero, a target position as a position on a target trajectory where a position at a time when the control is started is defined as a start point and a position where the person gets off the vehicle as an end point, and a target speed as a speed on a speed trajectory, which is obtained by differentiating the target trajectory. The vehicle is controlled to follow the target position and speed, and move to the person get-off position. As described above, if the vehicle travels a certain distance after the person gets it off, an intelligent and safe vehicle can be realized by making the vehicle return to the position where the person gets off the vehicle.

According to the control method according to the present embodiment, since the vehicle can stand independently even when the occupant is not thereon, there is no need to support with person's hand(s) or to use a kickstand. Additionally, the vehicle can stably stop independently even on the slope.

Further, even if the occupant jumps off the vehicle or falls therefrom, the vehicle can stop safely without traveling away. If required, the vehicle can be made to return to a position where the occupant falls therefrom. Additionally, if a mode is switched to a haul mode based on an instruction from a switch or a judgment from an output of a pitch angle sensor or a pitch angular velocity sensor when the occupant is not on the vehicle, the vehicle can be easily hauled by changing a vehicle attitude with a small force.

Here, control will be explained in a case where the occupant is on the vehicle and in a case where the occupant is not thereon, respectively. As $M_B$ (mass of a vehicle body) and $J_B$ (moment of inertia of the vehicle body) of physical models explained hereinafter, linearization is performed using a combined mass of vehicle+occupant and combined moment of inertia when the occupant is on the vehicle, while linearization is performed using a mass of the vehicle only and moment of inertia when the occupant is not on the vehicle.

These physical models can be represented using so-called state representation of the system (x denotes a state variable, u a control input, and A and B matrices.), $$\dot{x} = Ax + Bu,$$

as a following state representation. $\theta_w$ denotes an angle of the wheel, while $\theta_B$ an angle of the vehicle body. $\theta'_w$ denotes an angular velocity of the wheel, while $\theta'_B$ an angular velocity of the vehicle body.

A subscript w denotes a variable on the wheel, while a subscript B a variable on the vehicle body.

$$\frac{d}{dt}\begin{pmatrix}\theta_w\\\theta_B\\\dot{\theta}_w\\\dot{\theta}_B\end{pmatrix} = A\begin{pmatrix}\theta_w\\\theta_B\\\dot{\theta}_w\\\dot{\theta}_B\end{pmatrix} + B\tau$$

Here, the system can be stabilized by performing a following state feedback when a control input u is defined as torque t. Namely, a gain K can be evaluated with techniques, such as pole assignment of (A−BK) and an optimal regulator.

$$\tau = -Kx \quad K = (k_1\ k_2\ k_3\ k_4)$$

Figure 5:
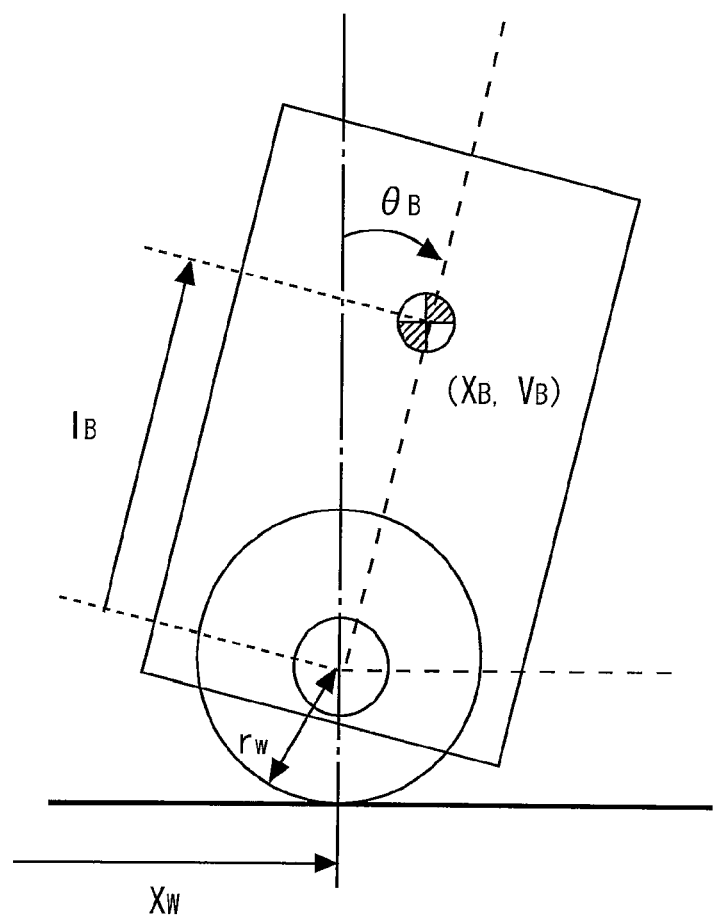
FIG. 5 is an illustration of a physical model of a general wheeled inverted pendulum.

Next, a general physical model of a wheeled inverted pendulum will be explained using FIG. 5. First, variables used for the following explanation will be explained. M denotes a mass [kg] of the system (vehicle+occupant). $M_B$ denotes the combined mass of vehicle+occupant when the occupant is on the vehicle, while it denotes the mass of the vehicle only when the occupant is not on the vehicle. J denotes moment of inertia [kgm²] applied to the system. $J_B$ denotes the combined moment of inertia of vehicle+occupant when the occupant is on the vehicle, while it denotes moment of inertia of the vehicle only when the occupant is not on the vehicle. x denotes a horizontal position [m] from an original point. y denotes a vertical position [m] from the axle. θ denotes an angle [rad]. $l_B$ denotes a distance [m] from the axle to a center of gravity of a step board (vehicle body). $r_w$ denotes a wheel radius (radius of wheel of the vehicle) [m]. g denotes gravitational acceleration [m/s²].

$D_\theta$ denotes a viscous friction coefficient (travel resistance) [Nms] between the step board and the wheel. $D_{\theta w}$ denotes a viscous friction coefficient (travel resistance) [Nms] between the wheel and a road surface. Note that a subscript w denotes a variable on the wheel, while a subscript B a variable on the step board.

First, a following equation is obtained on kinetic energy and potential energy of the wheel.

Kinetic energy of the wheel $$T_W = \frac{1}{2}M_W \dot{x}_W^2 + \frac{1}{2}J_W \dot{\theta}_W^2$$

Potential energy of the wheel $$U_w = 0$$

Next, a following equation is obtained on kinetic energy and potential energy of the step board.

Kinetic energy of the step board $$T_B = \frac{1}{2}M_B(\dot{x}_B^2 + \dot{y}_B^2) + \frac{1}{2}J_B\dot{\theta}_B^2$$
$$= \frac{1}{2}M_B(\dot{x}_W^2 + 2\dot{x}_W\dot{\theta}_B l_B\cos\theta_B + l_B^2\dot{\theta}_B^2) + \frac{1}{2}J_B\dot{\theta}_B^2$$

Potential energy of the step board $$U_B = M_B g Y_B = M_B g l_B \cos\theta_B$$

Here, $$\text{given } x_W = r_W \theta_W,$$

Lagradian L shown in a following equation can be obtained on the wheel and the step board, respectively.

$$L = (T_W + T_B) - (U_W + U_B)$$
$$\frac{d}{dt}\left(\frac{\partial L}{\partial \dot{\theta}_W}\right) - \frac{\partial L}{\partial \theta_W} + D_\theta(\dot{\theta}_W - \dot{\theta}_B) + D_{\theta w}\dot{\theta}_W = \tau$$
$$\frac{d}{dt}\left(\frac{\partial L}{\partial \dot{\theta}_B}\right) - \frac{\partial L}{\partial \theta_B} + D_\theta(\dot{\theta}_B - \dot{\theta}_W) = -\tau$$

Hence, following equations of motion can be obtained.

$$\ddot{\theta}_W = \frac{M_B r_W l_B \sin\theta_B (M_B l_B^2 + J_B)}{D}\dot{\theta}_B^2 -$$
$$\frac{D_\theta(M_B l_B^2 + J_B + M_B r_W l_B \cos\theta_B)}{D}(\dot{\theta}_W - \dot{\theta}_B) - \frac{D_{\theta w}(M_B l_B^2 + J_B)}{D}\dot{\theta}_W -$$
$$\frac{M_B^2 g l_B^2 r_W \sin\theta_B \cos\theta_B}{D} + \frac{M_B l_B^2 + J_B + M_B r_W l_B \cos\theta_B}{D}\tau$$
$$\ddot{\theta}_B = -\frac{M_B^2 l_B^2 r_W \sin\theta_B \cos\theta_B}{D}\dot{\theta}_B^2 +$$
$$\frac{D_\theta\{(M_B + M_W)r_W^2 + J_W + M_B l_B r_W \cos\theta_B\}}{D}(\dot{\theta}_W - \dot{\theta}_B) +$$
$$\frac{D_{\theta w}M_B l_B r_W \cos\theta_B}{D}\dot{\theta}_W + \frac{M_B g l_B \sin\theta_B\{(M_B + M_W)r_W^2 + J_W\}}{D} -$$

-continued $$\frac{M_B l_B r_W \cos\theta_B + (M_B + M_W)r_W^2 + J_W}{D}\tau$$

$$D = \{(M_B + M_W)r_W^2 + J_W\}(M_B l_B^2 + J_B) - M_B^2 l_B^2 r_W^2 \cos^2\theta_B$$

Further, given $\theta_B \ll 1, \dot{\theta}_B \ll 1 \rightarrow \sin\theta_B = \theta_B, \cos\theta_B = 1, \dot{\theta}_B^2 = 0$, the aforementioned equations of motion can be linearized as shown hereinafter.

$$\ddot{\theta}_W = -\frac{D_{\theta W}(M_B l_B^2 + J_B + M_B r_W l_B)}{D}(\dot{\theta}_W - \dot{\theta}_B) -$$

$$\frac{D_{\theta W}(M_B l_B^2 + J_B)}{D}\dot{\theta}_W - \frac{M_B^2 g l_B^2 r_W}{D}\theta_B + \frac{M_B l_B^2 + M_B r_W l_B}{D}\tau$$

$$\ddot{\theta}_B = \frac{D_\theta\{(M_B + M_W)r_W^2 + J_W + M_B l_B r_W\}}{D}(\dot{\theta}_W - \dot{\theta}_B) +$$

$$\frac{D_{\theta W} M_B l_B r_W}{D}\dot{\theta}_W + \frac{M_B g l_B \sin\theta_B\{(M_B + M_W)r_W^2 + J_W\}}{D} -$$

$$\frac{M_B l_B r_W + (M_B + M_W)r_W^2 + J_W}{D}\tau$$

$$D = \{(M_B + M_W)r_W^2 + J_W\}(M_B l_B^2 + J_B) - M_B^2 l_B^2 r_W^2$$

Other Embodiment

Figure 4:
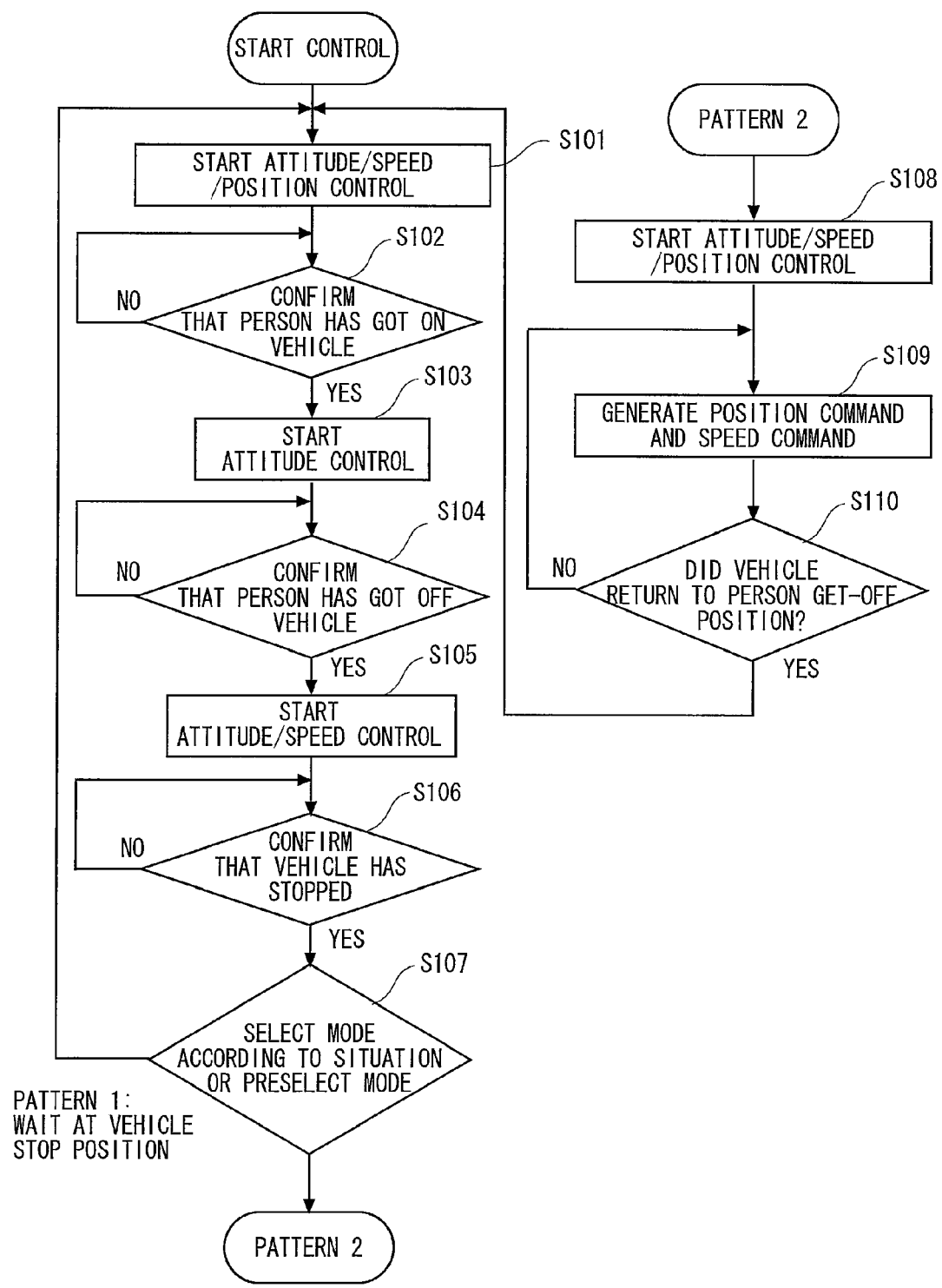
FIG. 4 is a flow chart showing a flow of behavior control of the coaxial two-wheel vehicle according to the embodiment of the present invention.

The control mode shown in FIG. 4 can also be switched to a haul mode based on a judgment from the switch and the pitch angular velocity sensor. In the haul mode, position control and speed control are switched off, and only attitude control is performed. As a result of this, the vehicle can be easily hauled by changing an attitude with a small force.

Each of the above-described embodiments can be combined as desirable by one of ordinary skill in the art.

An exemplary advantage according to the above-described embodiments is to be able to provide a coaxial two-wheel vehicle in which stability is enhanced at a time when an occupant is not thereon and a method for controlling the coaxial two-wheel vehicle.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A coaxial two-wheel vehicle comprising:
a drive means that drives two wheels arranged coaxially;
a detection means that obtains get-on/off information indicating whether an occupant is on the vehicle or not, and attitude information of the vehicle; and
a control means that performs attitude control by controlling drive of the wheels performed by the drive means based on a control gain, the attitude information obtained by the detection means and a command value,
wherein the control means controls the drive means by switching to a mode in which a control gain set with respect to an occupied state is used if the control means determines that the vehicle is in the occupied state based on the get-on/off information obtained by the detection means, while switching to a mode in which a control gain set with respect to an unoccupied state is used if the control means determines that the vehicle is in the unoccupied state, respectively,
the detection means obtains a vehicle pitch angle and a vehicle pitch angular velocity as the attitude information,
the control means controls the drive means according to the obtained vehicle pitch angle by switching a command value to a target pitch angle corresponding to an occupied state if the control means determines that the vehicle is in the occupied state, while switching the command value to a target pitch angle corresponding to an unoccupied state if the control means determines that the vehicle is in the unoccupied state, respectively, and
the control means controls the drive means by setting a command value in which a target pitch angular velocity is defined as substantially zero if the control means determines that the vehicle is in an unoccupied state.

2. The coaxial two-wheel vehicle according to claim 1, wherein the detection means obtains a vehicle speed as the attitude information, and
the control means controls the drive means by setting a command value for reducing a target speed if the control means determines that an occupied state of the vehicle has transited to an unoccupied state of the vehicle.

3. The coaxial two-wheel vehicle according to claim 1, wherein
the detection means obtains a vehicle speed as the attitude information, and
the control means controls the drive means so that the vehicle may stay at its stop position if the control means determines that an occupied state of the vehicle has transited to an unoccupied state of the vehicle and that the vehicle speed is reduced to be substantially zero.

4. The coaxial two-wheel vehicle according to claim 1, wherein
the detection means obtains a vehicle speed and a vehicle position as the attitude information, and
the control means controls the drive mechanism so that the vehicle may return to a person get-off position if the control means determines that an occupied state of the vehicle has transited to an unoccupied state of the vehicle and that the vehicle speed is reduced to be substantially zero.

5. The coaxial two-wheel vehicle according to claim 1, wherein
the detection means obtains a vehicle speed and a vehicle position as the attitude information, and
the control means controls the drive means according to either a mode in which the vehicle stays at its stop position or a mode in which the vehicle returns to a person get-off position if the control means determines that an occupied state of the vehicle has transited to an unoccupied state of the vehicle and that the vehicle speed is reduced to be substantially zero, and
if a distance between the person get-off position and a current vehicle position is longer than a predetermined value, the mode is selected in which the vehicle stays at its stop position, while if the distance is not more than the predetermined value, the mode is selected in which the vehicle returns to the person get-off position.

6. The coaxial two-wheel vehicle according to claim 1, wherein
the detection means obtains a vehicle speed and a vehicle position as the attitude information, and
the control means controls the drive means according to either a mode in which the vehicle stays at its stop position or a mode in which the vehicle returns to a person get-off position if the control means determines that an occupied state of the vehicle has transited to an unoccupied state of the vehicle and that the vehicle speed is reduced to be substantially zero, and if a distance between the person get-off position and a current vehicle position is longer than a predetermined value, the mode is selected in which the vehicle returns to the person get-off position, while if the distance is not more than the predetermined value, the mode is selected in which the vehicle stays at its stop position.

7. The coaxial two-wheel vehicle according to claim 1, wherein the detection means obtains a vehicle speed, a vehicle position, and a vehicle yaw angle as the attitude information, and the control means controls the drive means according to either a mode in which the vehicle stays at its stop position or a mode in which the vehicle returns to a person get-off position if the control means determines that an occupied state of the vehicle has transited to an unoccupied state of the vehicle and that the vehicle speed is reduced to be substantially zero, and if a difference between a yaw angle at a time when a person gets off the vehicle and a current yaw angle is larger than a predetermined value, the mode is selected in which the vehicle stays at its stop position, while if the difference is not more than the predetermined value, the mode is selected in which the vehicle returns to the person get-off position.

8. A method for controlling a coaxial two-wheel vehicle, comprising the steps of:

detecting whether an occupant is on the vehicle or not; and performing attitude control using a control gain set with respect to an occupied state if it is determined that the vehicle is in the occupied state, performing attitude control using a control gain set with respect to an unoccupied state if it is determined that the vehicle is in the unoccupied state, wherein, if it is determined that the vehicle is in an occupied state, attitude control is performed by setting a command value to a target pitch angle corresponding to the occupied state, if it is determined that the vehicle is in an unoccupied state, attitude control is performed by setting the command value to a target pitch angle corresponding to the unoccupied state, and, if it is determined that the vehicle is in an unoccupied state, a command value is set in which a target pitch angular velocity is defined as substantially zero.

9. The method for controlling a coaxial two-wheel vehicle according to claim 8, wherein if it is determined that an occupied state of the vehicle has transited to an unoccupied state of the vehicle, a vehicle speed is controlled to be reduced.

10. The method for controlling a coaxial two-wheel vehicle according to claim 8, wherein if it is determined that an occupied state of the vehicle has transited to an unoccupied state of the vehicle and that a vehicle speed is reduced to be substantially zero, the vehicle is controlled to stay at its stop position.

11. The method for controlling a coaxial two-wheel vehicle according to claim 8, wherein if it is determined that an occupied state of the vehicle has transited to an unoccupied state of the vehicle and that a vehicle speed is reduced to be substantially zero, the vehicle is controlled to return to a person get-off position.

12. The method for controlling a coaxial two-wheel vehicle according to claim 8, wherein if it is determined that an occupied state of the vehicle has transited to an unoccupied state of the vehicle and that a vehicle speed is reduced to be substantially zero, the vehicle is controlled according to either a mode in which the vehicle stays at its stop position or a mode in which the vehicle returns to a person get-off position, and if a distance between the person get-off position and a current vehicle position is longer than a predetermined value, the mode is selected in which the vehicle stays at its stop position, and if the distance is not more than the predetermined value, the mode is selected in which the vehicle returns to the person get-off position.

13. The method for controlling a coaxial two-wheel vehicle according to claim 8, wherein if it is determined that an occupied state of the vehicle has transited to an unoccupied state of the vehicle and that a vehicle speed is reduced to be substantially zero, the vehicle is controlled according to either a mode in which the vehicle stays at its stop position or a mode in which the vehicle returns to a person get-off position, and if a distance between the person get-off position and a current vehicle position is longer than a predetermined value, the mode is selected in which the vehicle returns to the person get-off position, and if the distance is not more than the predetermined value, the mode is selected in which the vehicle stays at its stop position.

14. The method for controlling a coaxial two-wheel vehicle according to claim 8, wherein if it is determined that an occupied state of the vehicle has transited to an unoccupied state of the vehicle and that a vehicle speed is reduced to be substantially zero, the vehicle is controlled according to either a mode in which the vehicle stays at its stop position or a mode in which the vehicle returns to a person get-off position, and if a difference between a yaw angle at a time when a person gets off the vehicle and a current yaw angle is larger than a predetermined value, the mode is selected in which the vehicle stays at its stop position, and if the difference is not more than the predetermined value, the mode is selected in which the vehicle returns to the person get-off position.

15. A coaxial two-wheel vehicle comprising:

drive units that drive two wheels arranged coaxially;

a detector that obtains get-on/off information indicating whether an occupant is on the vehicle or not, and attitude information of the vehicle; and a controller that performs attitude control by controlling drive of the wheels performed by the drive units based on a control gain, the attitude information obtained by the detector and a command value, wherein the controller controls the drive units by switching to a mode in which a control gain set with respect to an occupied state is used if the controller determines that the vehicle is in the occupied state based on the get-on/off information obtained by the detector, while switching to a mode in which a control gain set with respect to an unoccupied state is used if the controller determines that the vehicle is in the unoccupied state, respectively, the detector obtains a vehicle pitch angle and a vehicle pitch angular velocity as the attitude information, the controller controls the drive units according to the obtained vehicle pitch angle by switching a command value to a target pitch angle corresponding to an occupied state if the controller determines that the vehicle is in the occupied state, while switching the command value to a target pitch angle corresponding to an unoccupied state if the controller determines that the vehicle is in the unoccupied state, respectively, and the controller controls the drive units by setting a command value in which a target pitch angular velocity is defined as substantially zero if the controller determines that the vehicle is in an unoccupied state.

* * * * *

UNITED STATES PATENT AND TRADEMARK OFFICE
CERTIFICATE OF CORRECTION

PATENT NO. : 8,068,976 B2
APPLICATION NO. : 12/511174
DATED : November 29, 2011
INVENTOR(S) : Yusuke Hosaka It is certified that error appears in the above-identified patent and that said Letters Patent is hereby corrected as shown below:

| Column | Line | |
|---|---|---|
| 11 | 53 | Change "$\tau = -Kx\ K=(k_1\ k_2\ k_3\ k_4)$" to $$-- \tau = -Kx \quad K = (k_1\ k_2\ k_3\ k_4) --.$$ |
| 12 | 33 | Change "$U_B = M_B g Y_B = M_B g l_B \cos \theta_B$" to $$-- U_B = M_B g y_B = M_B g l_B \cos \theta_B --.$$ |

Signed and Sealed this
Twenty-fifth Day of December, 2012

David J. Kappos
*Director of the United States Patent and Trademark Office*